United States Patent [19]

Price et al.

[11] Patent Number: 4,989,720
[45] Date of Patent: Feb. 5, 1991

[54] ICE CREAM SANDWICH COLLATING APPARATUS

[75] Inventors: Floyd W. Price, Freehold, N.J.; Harry W. Sloan, Charlotte, N.C.

[73] Assignee: Interbake Foods, Inc., Elizabeth, N.J.

[21] Appl. No.: 474,627

[22] Filed: Jan. 29, 1990

Related U.S. Application Data

[63] Continuation of Ser. No. 206,563, Jun. 2, 1988, abandoned.

[51] Int. Cl.[5] .............................................. B65G 29/00
[52] U.S. Cl. ................................... 198/430; 198/468.1
[58] Field of Search ..................... 198/430, 746, 468.1, 198/730, 374, 429

[56] References Cited

U.S. PATENT DOCUMENTS

| | | | |
|---|---|---|---|
| 1,650,900 | 11/1927 | Mayers | 198/430 |
| 2,983,361 | 5/1961 | Tibbals | 198/430 |
| 3,294,257 | 12/1966 | Davies et al. | 414/62 |
| 3,724,639 | 4/1973 | Hara | 198/430 |
| 3,820,302 | 6/1974 | Doran et al. | 198/374 X |
| 4,265,354 | 5/1981 | Sinnema | 198/374 |
| 4,756,400 | 7/1988 | Funo et al. | 198/430 X |

FOREIGN PATENT DOCUMENTS

2427317 12/1975 Fed. Rep. of Germany ... 198/468.1

Primary Examiner—H. Grant Skaggs
Assistant Examiner—Cheryl L. Gastineau
Attorney, Agent, or Firm—Klauber & Jackson

[57] ABSTRACT

Apparatus for collating ice cream sandwiches for packaging, includes a flat dead plate; an endless belt conveyor for conveying the articles in a first direction onto the dead plate; a stop and guide for limiting movement of the ice cream sandwiches on the dead plate to a first position; an optical detector which detects when a predetermined number of the ice cream sandwiches have been conveyed to the first position on the dead plate against the stop; an air cylinder mounted above the dead plate; a sliding plate movable along the air cylinder; a pivot bracket secured to the sliding plate; an L-shaped pusher member pivotally mounted on the bracket for pushing the ice cream sandwiches from the first position to a second position in a second direction substantially transverse to the first direction so as to collate the ice cream sandwiches; a cam track fixed to the frame; a roller mounted on the pivot rod of the pusher member and which rides along the cam track from the first position to the second position so as to maintain the pusher plate in a pushing position and which rides above the cam track during the return of the pusher member to pivot the same above subsequent ice cream sandwiches conveyed onto the dead plate so as to permit conveyance of the subsequent ice cream sandwiches onto the dead plate during movement of the pusher member from the end position to the start position.

11 Claims, 6 Drawing Sheets

ICE CREAM SANDWICH COLLATING APPARATUS

This application is a continuation of application Ser. No. 07/201563 filed June 2, 1988 now abandoned.

BACKGROUND OF THE INVENTION

This invention relates generally to apparatus for collating articles for packaging and, more particularly, is directed to apparatus for collating wrapped ice cream sandwiches for packaging.

Conventionally, after an ice cream sandwich has been wrapped, it is placed on an endless conveyor belt with other wrapped ice cream sandwiches and serially moved along with the conveyor belt. The conveyor belt terminates in a dead plate onto which the ice cream sandwiches are deposited. As each wrapped ice cream sandwich is deposited on the dead plate, it pushes the ice cream sandwiches already on the dead plate further therealong. The wrapped ice cream sandwiches are then pushed off the dead plate onto a pair of pivoted wing plates. When a predetermined number of wrapped ice cream sandwiches, for example, three or four, are pushed onto the wing plates, the conveyor operation is stopped, and the wing plates open up to drop the wrapped ice cream sandwiches thereon onto a platform, the dropped ice cream sandwiches then being pushed by a pusher bar into a box for packaging.

However, such arrangement provides distinct disadvantages. In the first place, the distance that the wrapped ice cream sandwiches have to travel from the dead plate onto the wing plates is an extra 12 to 14 inches. Because of such distance, the amount of time necessary for collating the wrapped ice cream sandwiches adds cost and time to the operation and/or misoperation. In addition, when the wing plates open to drop the wrapped ice cream sandwiches onto the lower platform, the wrapped ice cream sandwiches sometimes tilt or deflect or are caught on the wing plates, which causes further delay in the operation and/or mis-operation. A third problem that results with such arrangement is that a four and one-half inch clearance between the lower platform and the surface of the closed wing plates is generally necessary in order to provide clearance for the opening of the wing plates. Because the ice cream sandwiches drop such a great distance, there is more apt to be problems with misalignment and the like, and there is a further delay involved. Lastly, there is a further delay in the operation since the conveyor belt cannot begin movement to push more wrapped ice cream sandwiches onto the wing plate until the wing plates have closed.

Accordingly, the aforementioned arrangement has presented distinct disadvantages in the collating of wrapped ice cream sandwiches for packaging purposes.

U.S. Pat. No. 3,294,257 to Davies et al. discloses a package handling apparatus including a pusher mechanism in which the pusher is moved vertically out of the way during the return stroke so as not to interfere with further incoming packages. Specifically, the packages in this patent are conveyed to a receiving station comprised of a series of elongated rollers that are spaced apart from each other. In this regard, it is noted that the packages are of a relatively larger size than the wrapped ice cream sandwiches according to the present invention. An intermittently operated ejector mechanism is provided for clearing the receiving station and, more specifically, of clearing the rollers of any row of packages deposited thereon. The ejector mechanism includes a series of dog arms having ends projecting above the plane defined by the tops of the rollers and positioned between adjacent rollers. A mechanism is provided for moving the dog arms in a first direction along the lengthwise direction of the rollers to eject the packages on the rollers onto another conveyor assembly. The dog arms are then returned to their original position. In order to accommodate the flow of packages into the receiving station during return of the dog arms, the dog arms are lowered prior to their return to a height lower than the tops of the rollers so that the ends do not impede the flow of other packages onto the receiving station.

However, such apparatus could not be used for the handling of wrapped ice cream sandwiches. In the first place, the ends of the dog arms assume specific point contact with the ice cream sandwiches which could dent or damage the wrapped ice cream sandwiches. Further, the wrapped ice cream sandwiches could not be used with the elongated rollers in the receiving station. Specifically, it is necessary to position the ice cream sandwiches on a flat plate to prevent the wrapped ice cream sandwiches being caught or trapped between elongated rollers. As such, if a flat plate is used, the dog arms in Davies et al. could not be used with wrapped ice cream sandwiches, and it is clear in the discussion in Davies et al. that the packages are much different.

U.S. Pat. No. 3,820,302 to Doran et al. discloses carton casing apparatus which is similar to the aforementioned disclosure in Davies et al. Specifically, a series of stationary bars are intermeshed in a cone-like manner, with a series of four reciprocal bars which are movable vertically and longitudinally with respect to the stationary bars. When a predetermined number of cartons have been transferred to the stationary bars, the reciprocal bars are moved vertically upward so as to engage the cartons, and then tabs which are also moved to an upward position at such time, are used for transferring the cartons to a point beneath a gripping-head assembly. The tabs are similar to the dog arms of the Davies et al. patent. However, as with Davies et al., the apparatus of Doran et al. could not be used with wrapped ice cream sandwiches since it is necessary to provide a substantially flat plate onto which the sandwiches are deposited. In such case, the tabs of Doran et al. could not be used.

Other handling apparatus are shown in U.S. Pat. Nos. 3,232,410; 3,669,283; 3,863,788; 4,214,655; 4,265,354; 4,228,886; and 4,517,791. However, these latter patents are less relevant than the Davies et al. and Doran et al. patents.

OBJECTS AND SUMMARY OF THE INVENTION

Accordingly, it is an object of the present invention to provide ice cream sandwich collating apparatus that overcomes the aforementioned problems with the prior art.

More particularly, it is an object of the present invention to provide ice cream sandwich collating apparatus in which the distance that the wrapped ice cream sandwiches must be pushed is reduced.

It is another object of the present invention to provide an ice cream sandwich collating apparatus which eliminates the need for any wing plates.

It is still another object of the present invention to provide ice cream sandwich collating apparatus in which the drop from the dead plate to the platform is one and one-half to two and one-half inches as opposed to the four and one-half inch clearance necessary in the prior art.

It is yet another object of the present invention to provide ice cream sandwich collating apparatus in which there is no delay in the conveying and pushing operations.

It is a further object of the present invention to provide an ice cream sandwich collating apparatus in which the pusher member is returned to its original starting position simultaneously with the conveying of new ice cream sandwiches onto the dead plate.

In accordance with an aspect of the present invention, apparatus for collating articles for packaging, includes a substantially flat plate; conveying means for conveying the articles in a first direction onto the flat plate; detector means for detecting when a predetermined number of the articles have been conveyed to a first position on the flat plate; pusher means for pushing the predetermined number of articles from the first position to a second position so as to collate the pushed articles; mounting means for mounting the pusher means above the flat plate for movement between a start position and an end position in a second direction substantially transverse to the first direction; and control means for moving the pusher means away from subsequent articles conveyed onto the flat plate when the pusher means is moved from the end position to the start position so as to permit conveyance of the subsequent articles onto the flat plate during movement of the pusher means from the end position to the start position.

The above and other objects, features and advantages of the present invention will become readily apparent from the following detailed description thereof which is to be read in connection with the accompanying drawings.

DETAILED DESCRIPTION OF A PREFERRED EMBODIMENT

Figure 1:
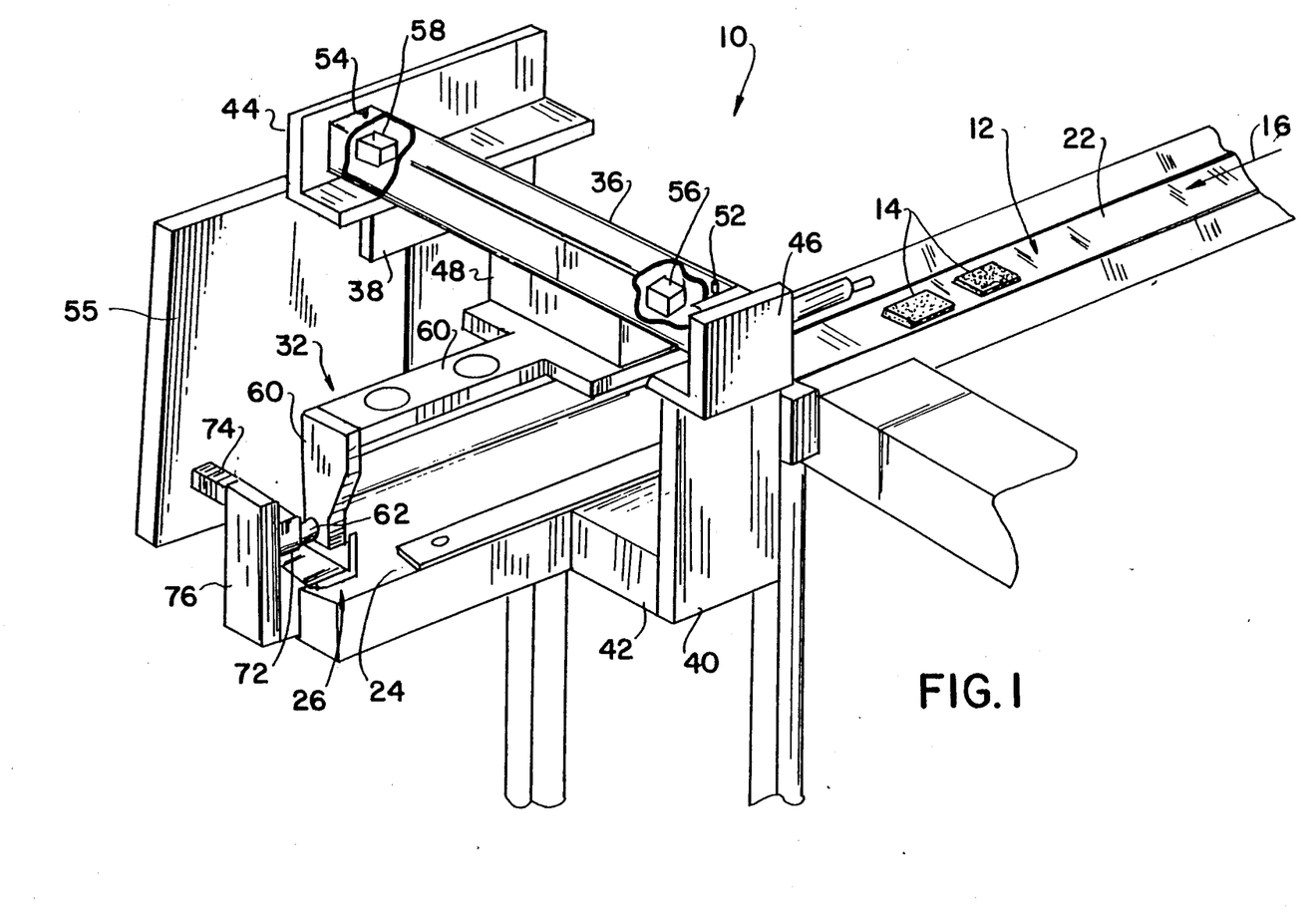
FIG. 1 is a perspective view of the ice cream sandwich collating apparats according to the present invention.
Figure 3:
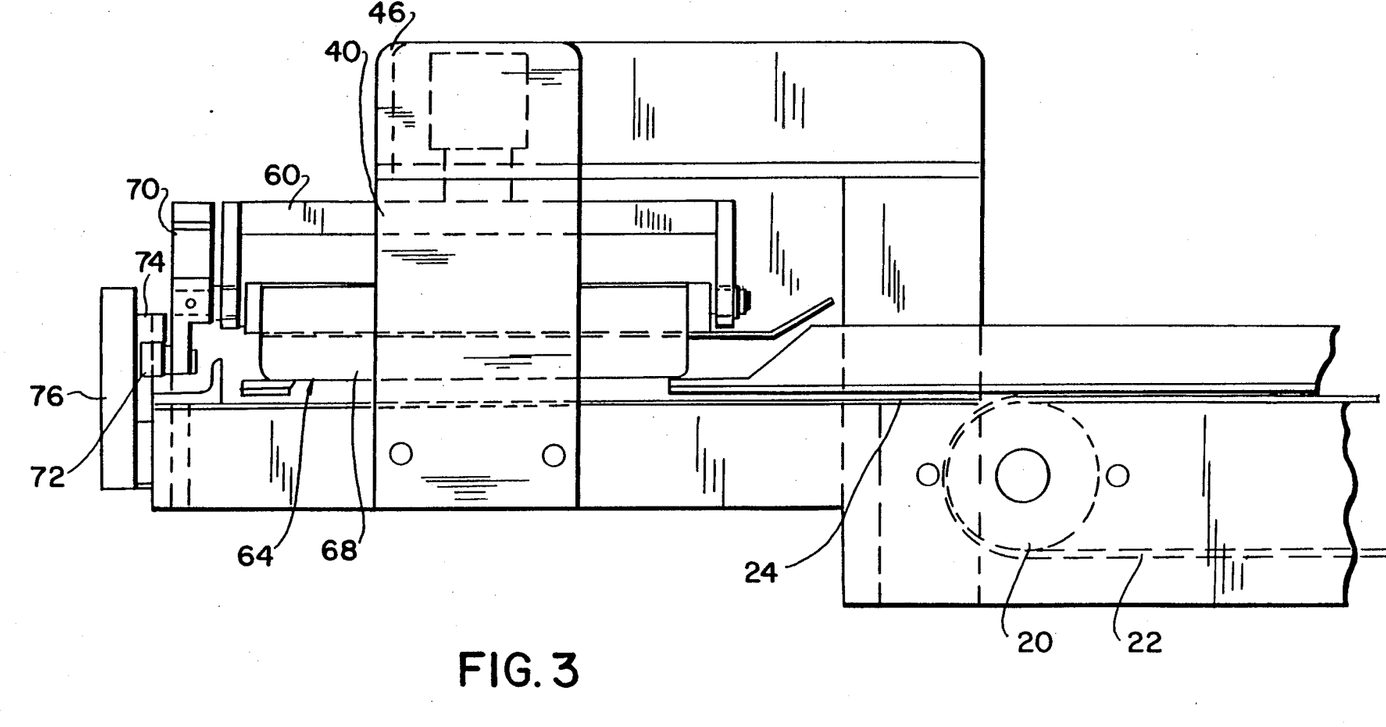
FIG. 3 is a side elevational view of the apparatus of FIG. 1.

Referring to the drawings in detail and initially to FIG. 1 thereof, an ice cream sandwich collating apparatus 10 according to the present invention includes a conveyor assembly 12 which conveys wrapped ice cream sandwiches 14 in linear, spaced-apart relation thereon, as is conventional, in the direction of arrow 16. Conveyor assembly 12 is conventional and includes end pulleys 20 having an endless belt 22 wrapped thereabout, as best shown in FIG. 3. The wrapped ice cream sandwiches 14 ride on the upper surface of endless belt 22. The forwardmost end of endless belt 22 terminates at the rear end of a substantially flat dead plate 24. As each next wrapped ice cream sandwich 14 is deposited at the rear end of dead plate 24, such deposited ice cream sandwich 14 pushes the already deposited ice cream sandwiches further along dead plate 14 in the direction of arrow 16. This operation continues until the forwardmost wrapped ice cream sandwich 14 abuts against a sandwich stop and guide 26, shown as an L-shaped plate at the lefthand side of FIG. 1.

A sandwich detecting mechanism 28 is provided with dead plate 24, immediately adjacent sandwich stop and guide 26 and in line with the conveyed ice cream sandwiches 14. Specifically, detecting mechanism 28 includes an electric eye, or the like. For example, detecting mechanism 28 includes an aperture 30 in dead plate 24. A light emitting diode or the like (not shown) shines a beam of light through aperture 30 which is received by a phototransistor (not shown) below aperture 30, as is well-known in the art. When no ice cream sandwich is in covering relation to aperture 30, the phototransistor detects the light from the light emitting diode and does not actuate a pushing mechanism. When the forwardmost ice cream sandwich 14 is pushed into covering relation to aperture 30 and thereby, against sandwich stop and guide 26, the light path is broken such that the phototransistor sends a signal to initiate the pushing operation, which will be discussed in detail hereinafter.

It will be appreciated that the wrapped ice cream sandwiches 14 are not further pushed onto wing plates, as is conventional. Therefore, there is a saving of 12 to 14 inches of travel of the ice cream sandwiches, which is generally more than half the distance the ice cream sandwiches previously had to travel from the rear of the dead plate to the dropping position on the wing plates.

Figure 4:
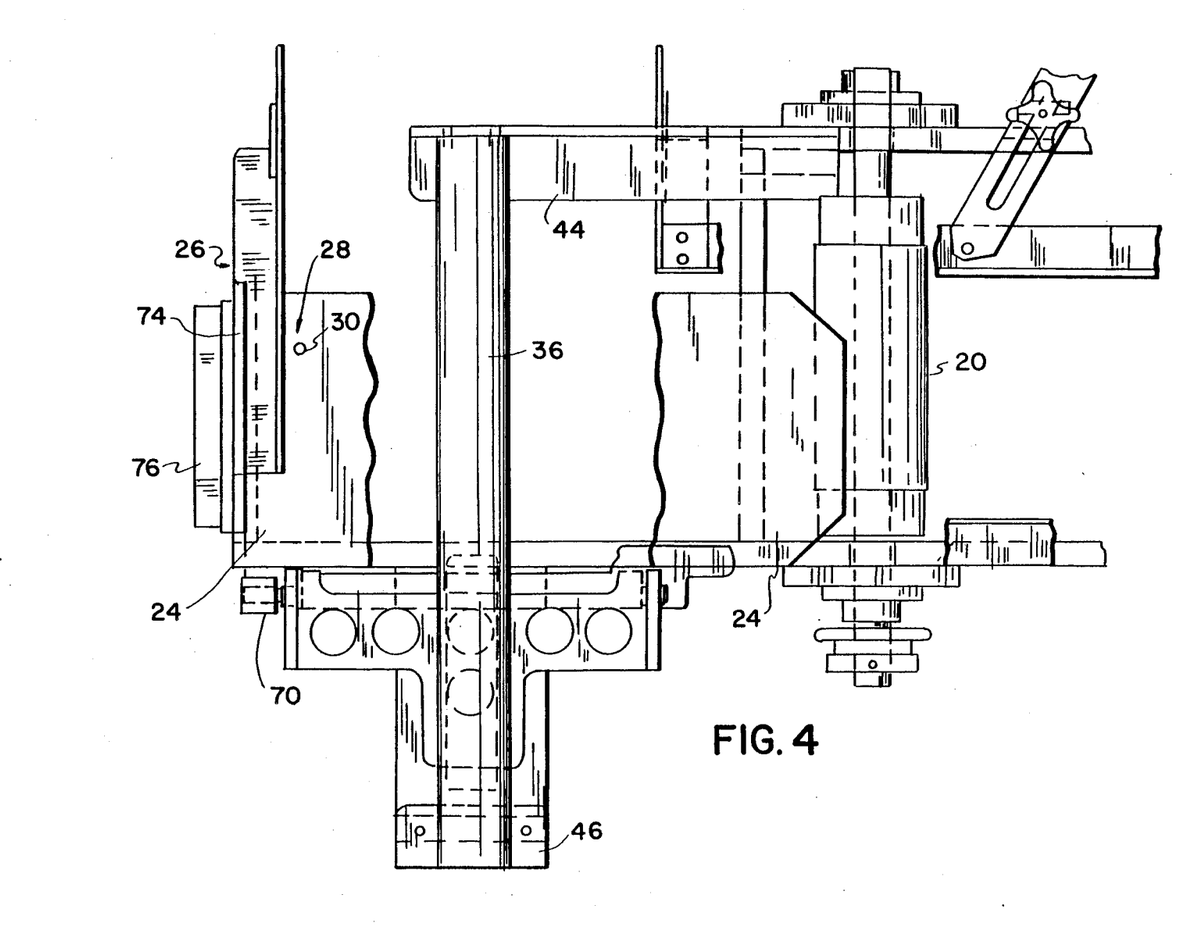
FIG. 4 is a top plan view of the apparatus of FIG. 1.

Apparatus 10 further includes a pusher mechanism 32 which pushes a predetermined number of ice cream sandwiches in a direction substantially transverse to that of arrow 16, that is, in the vertically upward direction in FIG. 4, along sandwich stop and guide 26 and onto a sloped chute 34, whereupon the wrapped ice cream sandwiches 14 are ready to be pushed into a box for packaging. In such case, it is ideally considered that either three of four wrapped ice cream sandwiches will be pushed by pusher mechanism 32. Thus, for example, it is possible to provide a twelve-pack of wrapped ice cream sandwiches by layering three rows of four ice cream sandwiches on each other. As another example, it is possible to provide a six-pack of wrapped ice cream sandwiches by layering two rows of three ice cream sandwiches on each other. With this arrangement, it is only necessary to provide a height difference between dead plate 24 and the platform (not shown) at the lower end of the sloped chute 34 of one and one-half inches for two layers or two and one-half inches for three layers of wrapped ice cream sandwiches. This distance is much less than the four and one-half inch clearance necessary for the wing plates of the prior art, and accordingly, there is less of a delay in the collating of the ice cream sandwiches.

Once the wrapped ice cream sandwiches have been layered on the platform at the lower end of sloped chute 34, a second pusher (not shown) is provided to push the layered ice cream sandwiches into a box for packaging.

Pusher mechanism 32 will now be discussed in detail.

Figure 5:
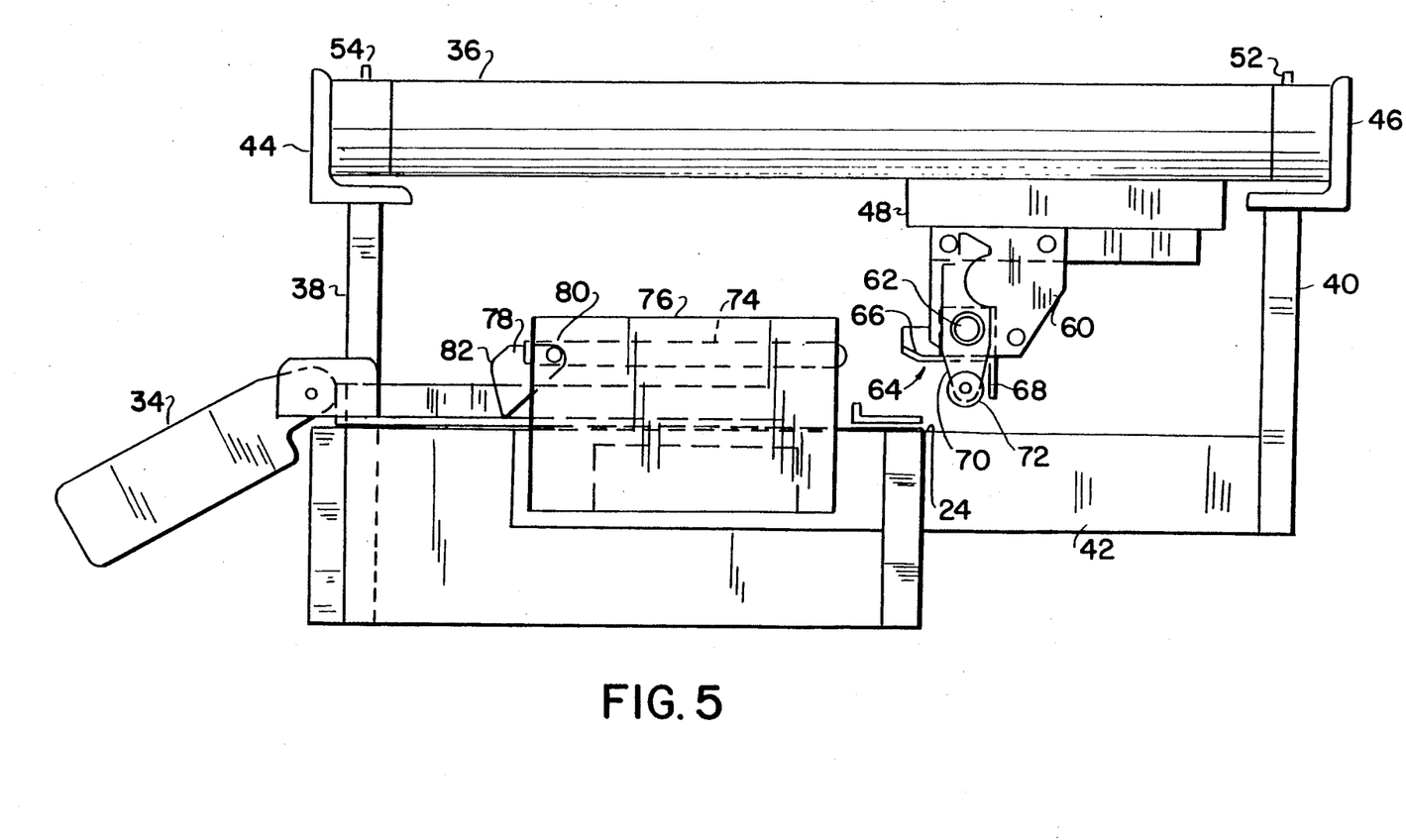
FIG. 5 is a front elevational view of the apparatus of FIG. 1.

Specifically, pusher mechanism 32 includes an air cylinder 36 that is supported at opposite ends thereof above dead plate 24 by vertical cylinder supports 38 and 40. Specifically, vertical cylinder supports 38 and 40 are supported at their lower ends by a rear cylinder support frame 42 which forms part of the framework of apparatus 10. Cylinder support brackets 44 and 46 are secured at the upper ends of vertical cylinder supports 38 and 40, respectively, and secure opposite ends of air cylinder 36 therebetween, as shown in FIG. 5.

Air cylinder 36 supports a sliding plate 48 externally at a lower end thereof for sliding movement therealong. Generally, air cylinder 36 is conventional, and sliding plate 48 slides along air cylinder 36 in dependence on the direction of pressurized air supply to air cylinder 36. Pressurized air is supplied from a compressed air supply 50, as seen in FIG. 5, which supplies air at one end of air cylinder 36 through a first valve 52 and to the opposite end of air cylinder 36 through a second valve 54, first valves 52 and 54 being controlled to selectively permit the supply of air from compressed air supply 50 to the respective end of air cylinder 36, as will be described in greater detail hereinafter. Thus, when pressurized air is supplied through first valve 52 to the right-hand end of air cylinder 36 as seen in FIG. 5, sliding plate 48 is caused to move to the left of air cylinder 36. In like manner, when pressurized air is supplied through second valve 54 to the opposite end of air cylinder 36, sliding plate 48 is caused to move from the left to the right of FIG. 5. In addition, the opposite ends of air cylinder 36 are provided with reed switches 56 and 58, respectively, to detect movement of sliding plate 48 to the respective opposite ends of air cylinder 36.

A pivot bracket 60 is secured at the underside of sliding plate 48 and includes a pivot rod 62 extending thereacross and which pivotally supports an L-shaped pusher member 64 comprised of a top sandwich guide plate 66 and a rear pusher plate 68. Normally, top sandwich guide plate 66 is arranged substantially parallel and above dead plate 24, with rear pusher plate 68 depending vertically downwardly from one edge thereof. In this manner, when sliding plate 48 moves from the right to the left in FIG. 5, rear pusher plate 68 engages the edges of a row of three or four adjacent and abutting wrapped ice cream sandwiches 14 so as to move the same along dead plate 24 and onto sloped chute 34.

Figure 2:
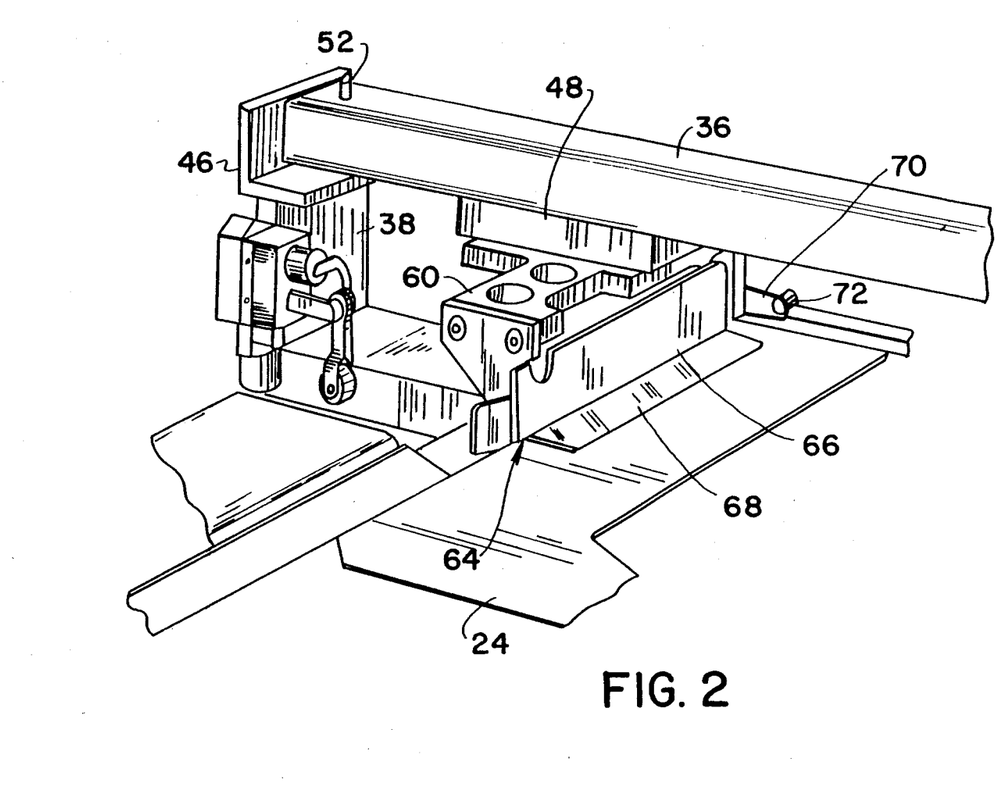
FIG. 2 is an enlarged perspective view of a portion of the apparatus of FIG. 1.

A pivot arm 70 is secured at one end of pivot rod 62 that extends externally of pivot bracket 60. Thus, pivot arm 70 extends vertically down in the same direction as rear pusher plate 68 and substantially parallel thereto. A guide roller 72 is rotatably secured at the free end of pivot arm 70. With this arrangement, pivot arm 70 pivots with pusher member 64 on pivot rod 62 from the position shown in FIG. 5 to a position 90 degrees offset in the clockwise direction therefrom, the latter position being shown in FIG. 2.

A cam track 74 having the shape of a substantially linear bar is secured to a cam mount plate 76 secured to the frame at one edge of apparatus 10. The left end of cam track 74, as viewed in FIG. 5, includes a cam trip plate 78 pivotally secured thereto about a pivot pin 80. When in its unbiased state, cam trip plate 78 pivots downwardly into contact with dead plate 24, thereby presenting an inclined upper surface 82.

When sliding plate 48 moves from the right side to the left side of FIG. 5, rear pusher plate 68 is in the position shown and engages the rear edges of a plurality of wrapped ice cream sandwiches 14 on dead plate 24 and pushes the same therealong to the left side of FIG. 5 onto sloped chute 34. During such travel, guide roller 72 rides beneath cam track 74 and is therefore prevented from rotating in the clockwise direction, so as to ensure that rear pusher plate 68 always pushes the wrapped ice cream sandwiches 14. At the left side of cam track 74, guide roller 72 hits against and moves cam trip plate 78 in the clockwise direction of FIG. 5 so as to move past cam trip plate 78, whereby the wrapped ice cream sandwiches 14 are completely moved onto sloped chute 34. Thereafter, cam trip plate 78 returns to the position shown in FIG. 5 by means of gravity. During the return travel from the left side to the right side of FIG. 5, guide roller 72 hits the inclined upper surface 82 of cam trip plate 78 and rides therealong onto the upper surface of cam track 74. As a result, pivot arm 70, and thereby pusher member 64, are rotated 90 degrees in the clockwise direction, to the position shown in FIG. 2. In such position, rear pusher plate 68 extends substantially parallel to and above dead plate 24, while top sandwich guide plate 66 extends vertically upward. In such position, rear pusher plate 68 is at a height above the upper surfaces of ice cream sandwiches 14 which are newly pushed onto dead plate 24. Thus, during the return of pusher member 64, wrapped ice cream sandwiches 14 can be continuously pushed onto dead plate 24 so that when pusher member 64 returns to its initial position as shown at the right side of FIG. 5, pusher member 64 is again ready to push a plurality of wrapped ice cream sandwiches 14 off of dead plate 24 and onto sloped chute 34. This results in a considerable amount of time saved since the ice cream sandwiches 14 can continuously be pushed onto dead plate 24 and need not stop for the return of pusher member 64.

Figure 6:
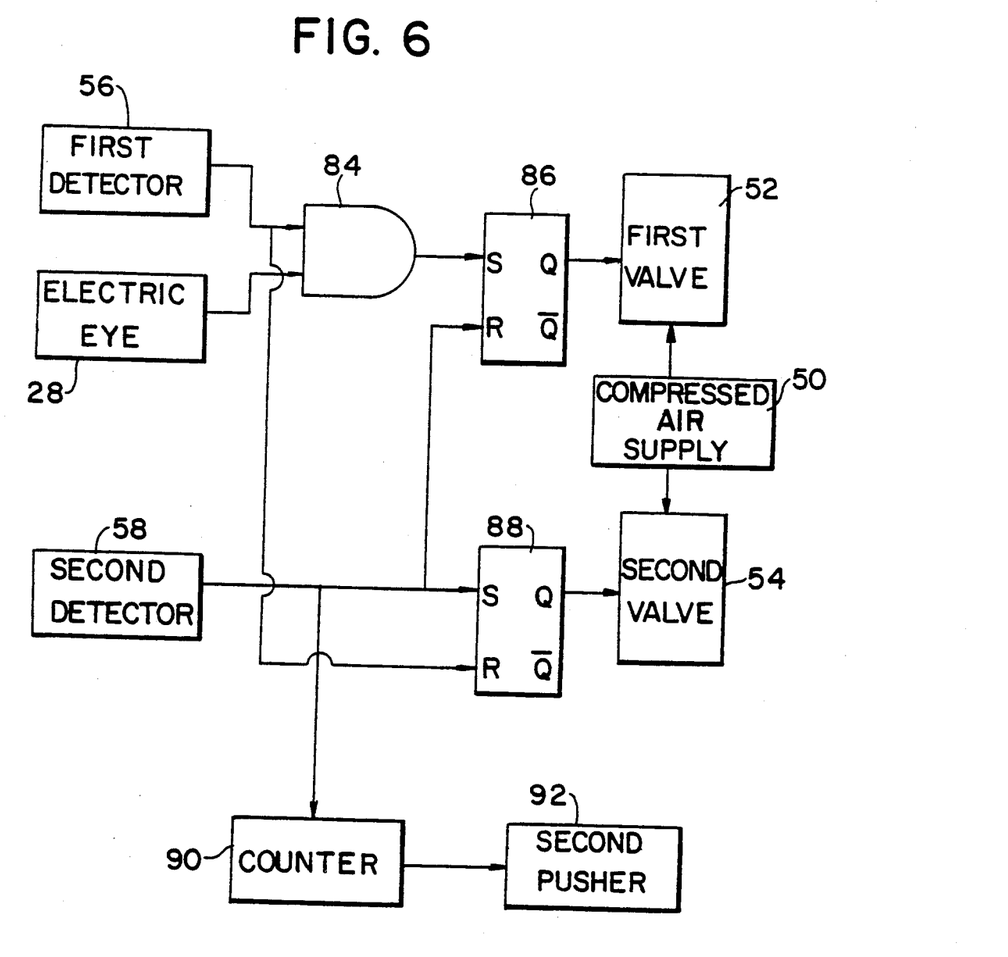
FIG. 6 is a circuit wiring diagram for controlling the apparatus of FIG. 1.

In order to control operation of sliding plate 48, and thereby of pusher member 64, reference is made to FIG. 6. As shown therein, a first detector in the form of the aforementioned reed switch 56 is provided at the starting end of air cylinder 36, that is, at the right side of FIG. 5. A second detector in the form of reed switch 58 at the opposite side of air cylinder 36 is also provided, along with sandwich detecting mechanism 28 in the form of an electric eye or the like. When sandwich detecting mechanism 28 detects a sandwich in covering relation to aperture 30, which indicates that a group of three or four sandwiches can be pushed onto sloped chute 34, sandwich detecting mechanism 28 supplies a logic level "1" signal to an AND gate 84. Thus, when first reed switch detector 56 detects sliding plate 48 at the right side of FIG. 5, that is, at the start of the pushing position, reed switch 56 also supplies a logic level "1" signal to AND gate 84. At such time, AND gate 84 supplies a logic level "1" signal to the set input S of a set-reset flip-flop 86 which, in turn, supplies a logic level "1" output signal from its Q output to first valve 52. As a result, pressurized air from compressed air supply 50 is supplied through first valve 52 to the right side of air cylinder 36 as viewed in FIG. 5, so as to move sliding plate 48, and thereby pusher plate 64, to the left of FIG. 5, whereby a group of wrapped ice cream sandwiches 14 are moved onto sloped chute 34. It is noted that as soon as sliding plate 48 moves away from the right side of air cylinder 36, reed switch 56 supplies a logic level "0" signal to AND gate 84 which, in turn, supplies a logic level "0" signal to the set input S of flip-flop 86. However, the Q output of flip-flop 86 remains at a logic level "1" signal so as to maintain first valve 52 open until a logic level "1" signal is supplied to the reset input R of flip-flop 86. Accordingly, the pressurized air supply is maintained to push sliding plate 48 to the left of FIG. 5.

When sliding plate 48 moves to the left end of air cylinder 36 as seen in FIG. 5, second reed switch detector 58 is activated to supply a logic level "1" signal to the reset input R of flip-flop 86. As a result, the Q output of flip-flop 86 becomes logic level "0" so as to turn OFF first valve 52 and prevent further pressurized air being supplied through the right side of air cylinder 36, as viewed in FIG. 5.

At the same time, the logic level "1" signal from second reed switch detector 58 is supplied to the set input S of another set-reset flip-flop 88 which, in turn, supplies a logic level "1" signal at its Q output to second valve 54 so as to open the same. Accordingly, pressurized air from compressed air supply 50 is supplied through second valve 54 to push sliding plate 48 back to the right side of FIG. 5. As soon as sliding plate 48 begins to move to the right in FIG. 5, second reed switch detector 58 supplies a logic level "0" signal to the set input S flip-flop 88. However, flip-flop 88 continues to supply its logic level "1" signal from the Q output thereof until a logic level "1" signal is supplied to the reset input R thereof.

When sliding plate 48 is moved back to the right end of cylinder 36 as shown in FIG. 5, first reed switch detector 56 again supplies a logic level "1" signal which is supplied to the reset input R of flip-flop 88 to reset the same and close second valve 54. Then, when sandwich detecting mechanism 28 detects a wrapped ice cream sandwich 14 in covering relation to aperture 30, it supplies a logic level "1" signal to AND gate 84 to start the operation again.

In addition, a counter can be used with regard to a second pusher mechanism (not shown) which pushes the layers of ice cream sandwiches that have been deposited from sloped chute 34, into a box. For example, each time that second reed switch detector 58 is actuated to supply a logic level "1" signal, it also supplies this signal to a counter 90. When a predetermined count has been reached, for example, a count of three corresponding to three layers of four wrapped ice cream sandwiches 14, counter 90 supplies a signal to a second pusher mechanism 92 which is actuated to push the layers of wrapped ice cream sandwiches 14 into a box for packaging.

Although digital circuitry has been described, it will be appreciated that analog circuitry can be substituted therefor.

It will therefore be appreciated that the present invention provides distinct advantages over the prior art by eliminating substantial delays from prior art processes. Thus, because rear pusher plate 68 is moved above the upper surfaces of subsequent ice cream sandwiches that are moved onto dead plate 24, there is no delay in the apparatus.

In the event of high speed operations, a rubber curtain 55 can be secured to cylinder support bracket 44, as shown in FIG. 1, to prevent the ice cream sandwiches from being pushed too hard off of sloped chute 34.

Thus, the present invention permits collating of wrapped ice cream sandwiches at speeds up to 160 sandwiches per minute at a continuous flow. There is thus better control of individual sandwiches, better alignment of sandwiches for easier loading into cartons, less down time, and thereby, increased productivity.

Having described a specific preferred embodiment of the invention with reference to the accompanying drawings, it will be appreciated that the present invention is not limited to that precise embodiment, and that various changes and modifications can be effected therein by one of ordinary skill in the art without departing from the spirit or scope of the invention as defined by the appended claims.

What is claimed is:

1. Apparatus for collating articles for packaging, comprising:

a substantially flat plate;

conveying means for conveying said articles in a first direction onto said flat plate;

detector means for detecting when a predetermined number of said articles have been conveyed to a first position on said flat plate;

pusher means for pushing said predetermined number of articles from said first position to a second position so as to collate said pushed articles;

mounting means for mounting said pusher means above said flat plate for movement between a start position and an end position in a second direction substantially transverse to said first direction, said mounting means including opposite vertical supports and air cylinder means mounted by said opposite vertical supports above said flat plate and extending substantially in said second direction;

sliding plate means slidably mounted along said air cylinder means for supporting said pusher means for movement in said second direction;

said mounting means further including pivot bracket means secured to said sliding plate means for pivotalloy mounting said pusher means such that said pusher means extends substantially in said first direction; and control means for moving said pusher means away from subsequent articles conveyed onto said flat plate when said pusher means is moved from said end position to said start position so as to permit conveyance of said subsequent articles onto said flat plate during movement of said pusher means from said end position to said start position.

2. Apparatus according to claim 1; wherein said pusher means includes a rear pusher plate for pushing said predetermined number of articles from said first position to said second position.

3. Apparatus according to claim 2; wherein said control means includes pivoting means for pivoting said rear pusher plate away from subsequent articles conveyed onto said flat plate when said pusher means is moved from said end position to said start position.

4. Apparatus according to claim 3; further including frame means; and wherein said mounting means includes a pivot rod for pivotally mounting said pusher means to said pivot bracket means, and said pivoting means includes cam track means fixedly secured to said frame, and cam means secured to said pivot rod and engaged with said cam track means for moving said rear pusher plate away from subsequent articles conveyed onto the flat plate when the pusher means is moved from the end position to the start position.

5. Apparatus according to claim 4; wherein said cam means includes a roller secured to said pivot rod and which rides on said cam track means.

6. Apparatus according to claim 5; wherein said roller rides along a lower surface of said cam track means when said pusher means moves from said start position to said end position, and said control means further includes trip plate means associated with said cam track means for moving said roller to an upper surface of said cam track means during movement of said pusher means from said end position to said start position so as to pivot said rear pusher plate away from subsequent articles conveyed onto the flat plate.

7. Apparatus according to claim 6; wherein said trip plate means is pivotally secured at an end position of said cam track means to permit said roller to pivot said trip plate means when said roller moves from the start position to the end so as to move past said cam track means and said trip plate means, whereupon said trip plate means returns to an initial position thereafter to move said roller to the upper surface of said cam track means during movement of the pusher means from said end position to said start position.

8. Apparatus for collating articles for packaging, comprising:
   a substantially flat plate;
   conveying means for conveying said articles in a first direction onto said flat plate;
   detector means for detecting when a predetermined number of said articles have been conveyed to a first position on said flat plate;
   pusher means for pushing said predetermined number of articles from said first position to a second position so as to collate said pushed articles;
   mounting means for mounting said pusher means above said flat plate for movement between a start position and an end position in a second direction substantially transverse to said first direction, said mounting means including opposite vertical supports and air cylinder means mounted by said opposite vertical supports above said flat plate and extending substantially in said second direction;
   sliding plate means slidably mounted along said air cylinder means for supporting said pusher means for movement in said second direction; and
   first and second switch means at opposite ends of said air cylinder means for detecting when said pusher means has moved to said start position and said end position, respectively; and
   control means for moving said pusher means away from subsequent articles conveyed onto said flat plate when said pusher means is moved from said end position to said start position so as to permit conveyance of said subsequent articles onto said flat plate during movement of said pusher means from said end position to said start position.

9. Apparatus according to claim 8; wherein at least one of said first and second switch means includes a reed switch mounted on said air cylinder means.

10. Apparatus according to claim 8; wherein said air cylinder means includes first port means for supplying pressurized air to one end of said air cylinder means and second port means at an opposite end of said air cylinder means for supplying pressurized air thereat.

11. Apparatus according to claim 10; further including circuit means for supplying pressurized air to said first port means of said air cylinder means when said first switch means detects said pusher means at said start position and said detector means detects a predetermined number of articles that have been conveyed to said first position on said flat plate, and for supplying pressurized air to said second port means of said air cylinder means when said second switch means detects said pusher means at said end position.

* * * * *